Aug. 23, 1938.   P. H. TERRY   2,127,656
PRODUCTION OF MOTION PICTURES OF THE ANIMATED CARTOON TYPE
Filed April 25, 1934   3 Sheets-Sheet 1

INVENTOR
PAUL H. TERRY
ATTORNEYS

Aug. 23, 1938.   P. H. TERRY   2,127,656
PRODUCTION OF MOTION PICTURES OF THE ANIMATED CARTOON TYPE
Filed April 25, 1934   3 Sheets-Sheet 3
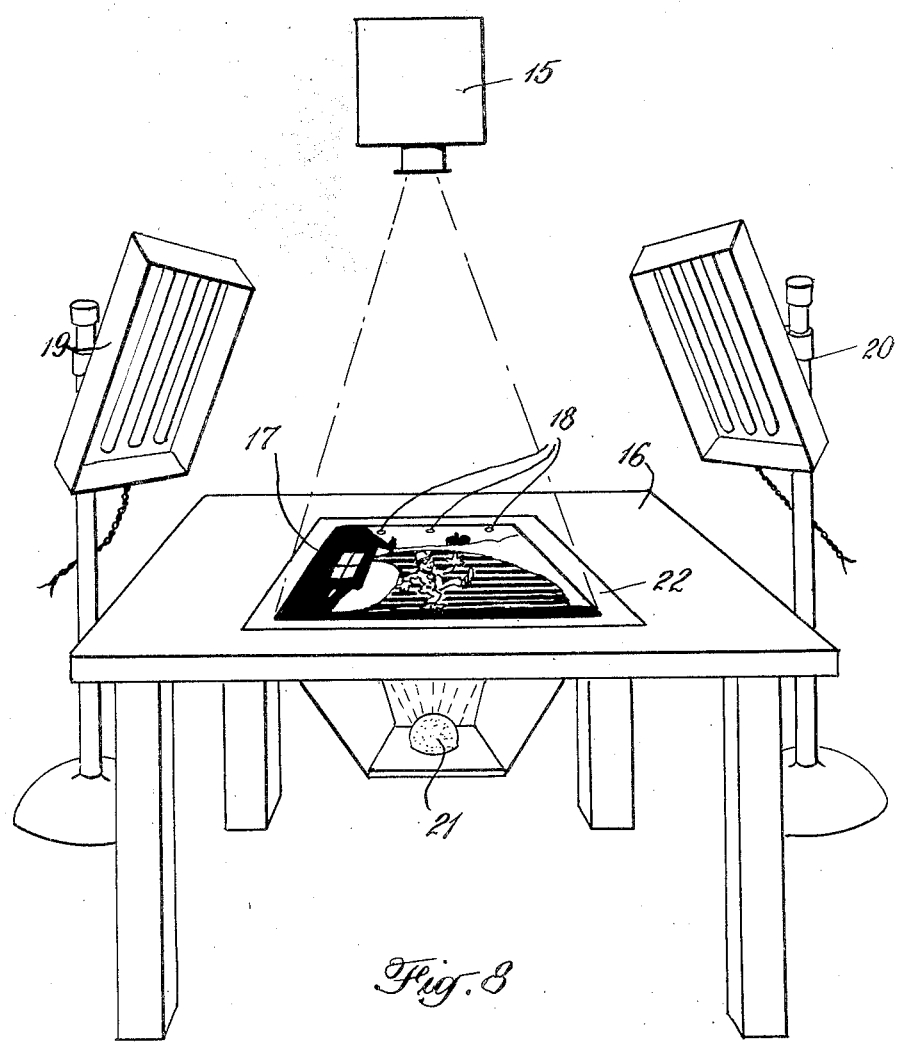
Fig. 8
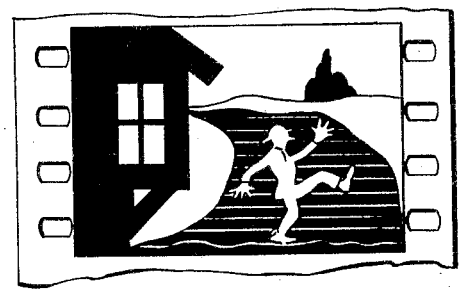
Fig. 5.a
INVENTOR
PAUL H. TERRY
BY
Pennie, Davis, Marvin and Edmonds.
ATTORNEYS Patented Aug. 23, 1938

2,127,656

UNITED STATES PATENT OFFICE 2,127,656

PRODUCTION OF MOTION PICTURES OF THE ANIMATED CARTOON TYPE

Paul H. Terry, Larchmont, N. Y.

Application April 25, 1934, Serial No. 722,220

11 Claims. (Cl. 88—16)

This invention relates to the production of motion picture films of the cartoon type, and it has for its particular object the provision of an improved method of making that variety known as animated cartoon films.

My improved method possesses many advantages, among which the the ease and rapidity with which animated cartoon films may be made either for color or black-and-white projection, but its greatest attributes are, first, the smooth lifelike appearance of the action on the screen, and second, the substantially perfect tempo of the action with the rhythm of the reproduced sound-music score, during projection.

Furthermore, in practicing my improved method, it is possible to take full advantage of all of the known improvements and technique of the motion picture animated cartoon art, thereby permitting great flexibility.

The various steps of my improved method and a way in which such a motion picture film, as a new article of manufacture, may be produced in practice, will be understood from the following description to be considered with the accompanying drawings, in which Fig. 1 illustrates a background scene sketched in black and white;

Fig. 2 schematically illustrates the taking of a photographic negative of the background scene sketch of Fig. 1;

Fig. 5a is an illustration similar to Fig. 5, except that small details of the action figure have been brought out in the photographing;

Fig. 8 is illustrative of a stop-motion picture camera apparatus and a lighting array therefor.

Figure 1:

In Fig. 1 there is illustrated a background scene against which at least a part of the action of the animated cartoon is intended to take place. Such a background scene may be prepared by an artist in the form of a wash or line drawing according to taste, or it may be a photographic positive print of an outdoor scene or the like, taken with a still or motion picture camera. If taken with a motion picture camera, it may be a changing scene. But, for simplicity and for the purposes of this explanation, it will be assumed that the background scene of Fig. 1 is an artist's sketch.

Figure 2:
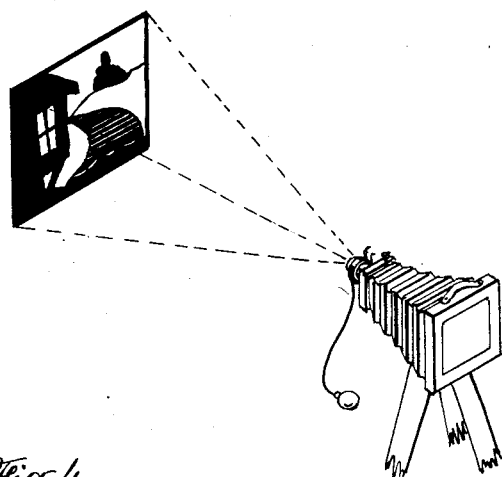
Figure 3:
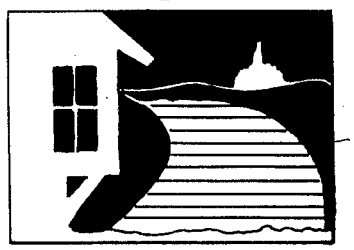
Fig. 3 is illustrative of a background negative rendered from the scene of Fig. 1.

The background scene is then photographed, as schematically illustrated in Fig. 2, on a frame of a motion picture film, or on a photographic plate, to obtain a negative thereof. Fig. 3 is illustrative of such a negative of the background scene of the sketch of Fig. 1. Thus, whatever is black in the original sketch or drawing has now become clear in the negative and all of the tonal qualities of the original sketch appear in their varying degrees in this negative.

Figure 4:
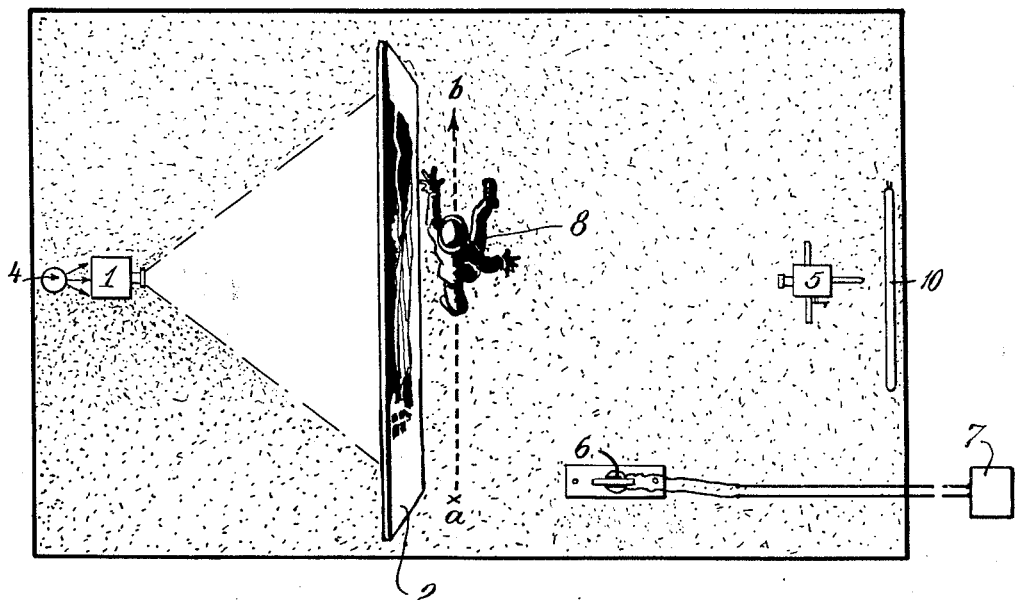
Fig. 4 illustrates schematically a view from above, of a sound-stage layout provided with a projector and a translucent screen.

The negative of the scene or background as shown in Fig. 3 is then ready for use in a studio or sound-stage, for example, as schematically illustrated in Fig. 4. In Fig. 4 the sound-stage is shown as provided with a projector 1, arranged on one side of a translucent screen 2, in such manner as to permit of the formation by projection, on the screen 2, of an enlarged image of the negative 3 (shown in Fig. 3) when illuminated by a light source 4. If the negative is a moving picture film, a changing scene may be produced.

On the opposite side of the translucent screen 2, there is arranged a motion picture camera 5 together with the usual sound equipment consisting of a microphone 6 electrically connected to an electrical sound recorder 7. The sound recorder 7 may be one of any of the well known types adapted to be operated synchronously with the motion picture camera 5, and it may be located at a distance from the sound-stage.

It will therefore be observed when the enlarged image of the image of the negative 3 is projected upon the translucent screen 2, there will appear on the surface of the screen 2 toward the moving picture camera 5, a definite and distinct image of the scene of Fig. 1. It is to be noted, however, that the enlarged image on the screen will be a negative, even though projected.

Now, assume that an actor 8 will perform successive poses as in walking, running, dancing, tumbling, etc., along or about the dotted line a—b in front of the translucent screen 2, with the projected image as a background.

To start operation, the enlarged image is first formed on the screen 2 by the projector 1, and a sound-music score is played appropriate to the action to be performed by the actor 8. The motion picture camera 5 and the recorder 7 are then started, and the successive poses of the actor are photographed against the projected image as a background. Thus, there is photographed from one side of the screen simultaneously on the successive frames of the film of the motion picture camera 5, both the successive poses of the actor and the projected image, to render motion picture negatives of the action with the background positive.

The reason why the photographic images of the successive film frames of the motion picture film will show the background positive, is that the projected image on the translucent screen 2 was a negative. But the images of the action will be negative and will show the actor in the successive film frames as a clear silhouette in all of the different positions or poses he may have assumed, when no supplemental light is used at the camera side of the screen. And these successive poses will have been photographed so as to be in substantially perfect tempo with the rhythm of the sound-music score picked up by the microphone 6 and synchronously recorded by the sound recorder 7.

It will be understood that the motion picture camera 5 will have been operated at the proper rate (i. e., exposures per second), as is customary in sound-motion picture recording.

Of course, an inanimate movable object or an animal might have been utilized instead of a person. In such event, the object should be moved in tempo with the rhythm of the sound-music score and, if an animal is used, some timed relation should exist between its performance and the score.

When a motion picture film exposed as above described is developed, the image of the actor will be clear with the background like a transparency or positive. Thus, if the film is held to the light, the background will now appear much the same as in the sketch of Fig. 1, but the figure of the actor appears against this background clear, showing no detail, as in Fig. 5. Detail, of course, must appear in the figure for the purposes of the cartoon, but this is supplied at a later step in the process and will be described hereinafter.

The developed film just described is now printed on positive film stock, which reverses the results. Thus, in the print, the background is negative and the figure of the actor in the film appears like a black silhouette, that is, the action appears in positive. A film frame of such an action positive, with the background negative, is illustrated in Fig. 6.

Figure 6:
Fig. 6 illustrates a positive film print of Fig. 5, having the action positive with the background negative.

The next step is to make enlargements of the positive film images, for example, bromide or the like, of each of the successive film frames, like the print of Fig. 6. These enlargements should be numbered in sequence to correspond with the film frames, or otherwise identified by suitable marking for the operation to be described hereinafter.

Figure 7:
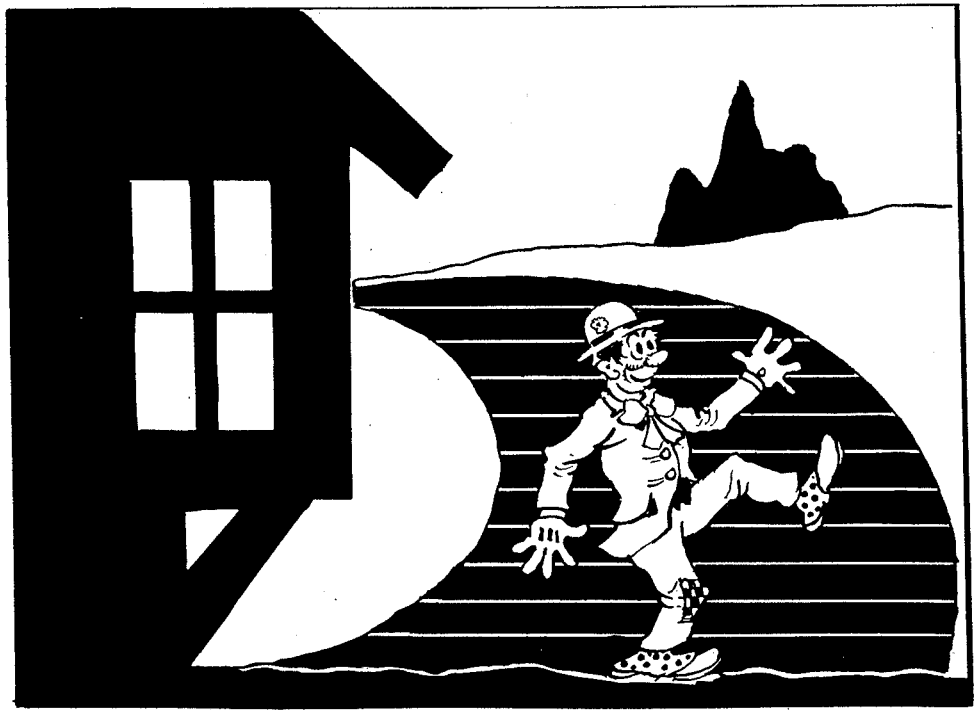
Fig. 7 is illustrative of an enlargement print of Fig. 6, the action image of the moving figure having been touched up and modified by an artist.

The background in the enlargements of each of the frames will now appear positive, and the actor or figure will appear white (negative) against the background. The figure may then be touched up to suit the taste of the artist by drawing in the eyes, etc., and supplying all the desired and missing detail, and toned different shades to suit, for example, as shown in Fig. 7. The facility and accuracy with which the missing detail can be supplied is assisted by the contrast between the foreground figure and the background. The greatest contrast is obtained when the foreground figure of the actor appears in the opposite sense to the background, i. e., when one is positive and the other negative.

It will be understood that some of the detail might have been taken care of in the studio on the sound-stage when the actor or person was being photographed. For example, the character could have been made up black, and the points to be touched up later could have been put on the black actor by applying a pure white or using lights, or a phosphorescent paint could be used which would photograph.

It is also to be observed that the actor need not be photographed solely by aid of the illumination produced by the enlarged image on the translucent screen 2, but that light sources, such as those indicated at 10, could have been arranged properly about the sound-stage, on the motion picture camera side of the actor. In this event, care should be exercised in balancing the light source intensity with the intensity of illumination of the image on the screen, so that the supplemental lighting will not tend to weaken or blur the image of the background and thus tend to destroy the desired effect. When supplemental lights are used in this manner the image of the actor does not appear as a clear silhouette, but instead, includes more or less of the detail, depending on the degree of supplemental lighting used. Such a case is shown in Fig. 5a, in which small details in black are shown on the otherwise clear silhouette of the action figure.

Referring now to the enlargement print shown in Fig. 7. This print is but one of the series or sequence of enlargements produced as the result of the printing operation above described. Assuming that the animated cartoon film is intended for black-and-white projection, it is now only necessary to successively photograph in proper sequence, by means of known stop-motion camera apparatus, the series or sequence of modified enlargements to produce all, or at least a portion of, a master negative motion picture film.

A stop-motion camera apparatus is schematically shown in Fig. 8, wherein 15 is the stop-motion camera directed down on a surface or table 16, upon which are laid successively between takes, each one of the sequence or series of bromide enlargements. One of these enlargements is indicated at 17, in Fig. 8.

It is well understood in the animated cartoon art, that suitable precautions should be taken to secure proper registration. This is attained by providing the unexposed bromide paper with spaced holes adapted to be placed on like spaced pins 18, arranged in the surface 16. Since all the sheets of bromide paper are punched alike, and the holes coincide with the like spaced pins, the registration remains fixed and yields the desired relationship upon exposure of the film by the stop-motion camera.

A lighting array such as the light sources 19, 20, and 21, may be employed to illuminate the enlargements. A sheet of clear glass 22, is utilized to hold the enlargement flat by placing it directly over the enlargement so that the glass lies between it and the stop-motion camera, as shown in Fig. 8.

Upon development of the motion picture film exposed by the stop-motion camera, a master negative film is obtained from which positive black-and-white prints may be produced for black-and-white projection.

In the production of sound films for general use, it is customary to combine the sound record and the pictures on a single continuous strip of positive film stock. Thus, the sound record sequence of the sound-music score is printed and arranged adjacent the film frames in the form of a sound record track. In this way, proper and permanent synchronism with the picture sequence is established and maintained. As is customary, the sound record pertaining to a given film frame picture is displaced the proper number of film frames therefrom, for synchronous reproduction during projection.

If it is desired to produce a film for color projection, whether it be a two-color or three-color process, the method and procedure hereinbefore described remains the same up to and including the step of making the bromide enlargements. However, it is not to be understood that my method and invention are limited to the use of bromide enlargements, for any type of photographic paper could be used and the type chosen will be determined by the contrast or softness and detail desired.

For color projection films, starting with the unmodified enlargements hereinbefore described, and before the detail, tone, etc., have been supplied as shown in Fig. 7, the form of the actor may be colored by tinting on the face of the print with dyes or opaque water-color. It is also advantageous to turn the picture over, face down, over a lightbox and illuminate it from below and block in the outline of the figure with some solid color, black being the most practical so that light will not penetrate and be transmitted from the reverse side.

For example, if it is desired that the figure of the character or person should be red, this color is painted on the face of the bromide enlargement, and on the reverse side thereof the figure should be masked out as just described. If the modified enlargement is now held to the light, the figure will appear as a black silhouette, but if observed by reflected light, the color of the figure appears red. The other portions of the enlargement, including the background portion, appear variant gray as in any black-and-white photographic print.

The desired coloring of the background which remains substantially constant through a given scene, may be attained by placing a transparent or translucent paper, or ground celluloid, over the bromide enlargement and coloring such transparency to the taste of the artist.

Now, when the final takes are to be made with the stop-motion camera arrangement of Fig. 8, the transparency carrying the colored or tinted background is placed under the bromide enlargement carrying the colored figure and in proper registration therewith. Then, by balancing the relative intensities of light from the source 21, below the picture and the sources 19, 20, above the picture, the desired effects may be obtained.

As before, the successive enlargements are then photographed with the stop-motion camera in proper sequence and registration, utilizing two or three-color process film as may be desired. And, like the procedure in connection with the preparation of film for black-and-white projection, the successive bromide enlargement prints are placed under the sheet of clear glass to hold them flat, with the transparency or translucent sheet carrying the color for the background under the bromide enlargement. The light from below illuminates the colored portion of the colored background transparency, and is transmitted through the bromide enlargement. The light sources from above the bromide enlargement illuminate the colored figure, and all of the rays, including the transmitted as well as reflected, properly balanced, serve to produce the proper color images to be photographed on a single frame of the color film employed in the stop-motion camera.

If it is desired to produce a background of strong color value in any of the successive frames of the color film, a properly colored celluloid may be placed on top of the bromide enlargement between the enlargement and the glass sheet holding the assemblage flat.

In the production of film for color projection, the same precautions are to be observed with the transparencies and bromide enlargements to obtain proper registration. This is readily accomplished by providing like spaced holes in both the unexposed bromide paper and the transparencies or celluloids. Since each of the sheets is punched to fit the like spaced pins 18, registration is obtained as described in connection with the production of film for black-and-white projection.

Figure 5:
Fig. 5 is illustrative of an action negative with the background positive.

It will be understood that the method and procedure above described may be modified or varied in practice, for example, the step of printing the developed film shown in Fig. 5 on positive stock, as shown in Fig. 6, may be omitted. In this event, enlargement prints are made directly from each of the film frames like Fig. 5. With this procedure, each of the enlargements of the film frame images will show the action positive with the background negative, similar to Fig. 6. This result is just the reverse of that which obtains in the enlargement illustrated in Fig. 7, which shows the action negative (before modification) with the background positive.

With the step of printing on positive film stock omitted, the artist then proceeds as before to tone, modify, and supply desired and missing detail to the action figure of the enlargement.

To produce a master negative film from such a series or sequence of modified enlargements, the operations described in connection with Fig. 8 are first performed to produce a master film with the stop-motion picture camera. Such a developed film will show images with the background positive and the action, now modified, toned and touched up by the artist, and similar in appearance to a positive. A master negative film may then be printed from this master film and film prints for general use may, in turn, be made from the master negative.

Other modifications may also be made by those skilled in the art without departing from the spirit and scope of the invention as defined in the following claims.

I claim:

1. In the production of motion picture films of the animated cartoon type, the method which comprises photographically rendering a negative of a background scene, forming an enlarged image of said background negative on a translucent screen by projection from one side of said screen, causing action to take place on the opposite side of said screen with the projected image as a background, said action being predominantly of a color contrasting with the predominant color of the projected background image, photographing from the said opposite side of the screen, simultaneously on successive film frames, both the projected image of the background negative and the successive positions of the action, to render motion picture negatives of said action with the background positive, producing positives of said action negatives with the background negative, producing photographic enlargements of each of the successive action positives, thus rendering the action negative and the background positive, adding carton detail to the action of said enlargements, and photographing successively in proper sequence and registration the modified enlargements to produce at least a portion of a master negative film.

2. In the production of motion picture films of the animated cartoon type, the method which comprises producing a motion picture negative film of a changing scene for use as a background, projecting from one side of a translucent screen said negative motion picture film images to form enlarged images thereof on said screen, causing action by a person to take place on the opposite side of said screen with the enlarged images of the changing scene as a background, said action being predominantly of a color contrasting with the predominant color of the projected background image, photographing from the said opposite side of the screen, simultaneously on successive film frames, both the projected negative images of the background scene and the successive positions of the person, to render motion picture negatives of said action with the background positive, producing positives of said action negatives with the background negative, producing photographic enlargements of each of the successive action positives, thus rendering the action negative and the background positive, modifying the action portion of said enlargements by adding cartoon detail thereto, and successively photographing in proper sequence and registration the modified enlargements to produce at least a portion of a master negative film.

3. In the production of motion picture films of the animated cartoon type, the method which comprises forming an enlarged negative image of a background scene and photographing in sequence the successive positions of a moving object with said image as a background, the moving object being predominantly of a color contrasting with the predominant color of the enlarged negative image of the background, producing enlargements of each of said photographic sequence, adding cartoon detail to the action of each of said enlargements, and preparing a motion picture film from the sequence of modified enlargements.

4. In the production of motion picture films of the animated cartoon type, the method which comprises producing on film frames images having a background scene and action figures, said action figures being substantially in silhouette, producing from said film frames enlargements having a positive background and action figures substantially in clear silhouette, modifying said enlargements by manually adding cartoon detail by drawing to the substantially clear silhouettes, and producing from said modified enlargements a film showing the background scene and action figures in desired detail and quality.

5. In the production of motion picture films of the animated cartoon type, the method which comprises projecting an enlarged image of a background scene onto a translucent screen, interposing action figures in the projected beam of light, photographing on film frames the background scene with the action figures at least partly in silhouette, producing enlargements from said film frames, modifying said enlargements by adding cartoon detail by drawing to the at least partly silhouetted figures, and preparing a motion picture film from the modified enlargements.

6. In the production of motion picture films of the animated cartoon type, the method which comprises projecting an enlarged image of a background scene onto a translucent screen, interposing action figures in the projected beam of light, supplying a small amount of additional illumination to bring out part of the detail of said action figures, photographing on film frames the background scene with the action figures at least partly in silhouette, producing enlargements from said film frames, modifying said enlargements by adding cartoon detail by drawing to the at least partly silhouetted figures, and preparing a motion picture film from the modified enlargements.

7. The method of producing motion picture films of the animated cartoon type which comprises forming an enlarged image of a background scene in negative on a translucent screen by projection from one side of said screen, causing action to take place on the opposite side of said screen with the projected image as a background, photographing from said opposite side of said screen by the use of the projected light on said screen, simultaneously on successive film frames, both the projected image of the background negative and the successive positions of said action, to render motion picture negative silhouettes of said action with said background positive, producing positives of said action with the background negative, producing photographic enlargements of each of the successive action positives, thus rendering the action negative and the background positive, modifying the silhouette images on said enlargements by adding cartoon detail thereto by drawing, and photographing successively in proper sequence and registration each of the modified enlargements to produce at least a portion of a master negative film.

8. The method of producing motion picture films of the animated cartoon type which comprises forming an image of a background scene in negative on a translucent screen by projection from one side of said screen, causing action to take place on the opposite side of said screen with the projected image as a background, photographing from the said opposite side of said screen by use of the light projected on said screen, simultaneously on successive film frames, both the projected image of the background negative and the successive positions of the action, to render motion picture negatives of said action with at least some of its detail missing, with the background positive, producing positives of said action negatives with the background negative, producing photographic enlargements of each of the successive action positives, thus rendering the action negative and the background positive, modifying said enlargements by adding cartoon detail to the action by drawing, and photographing successively in proper sequence and registration each of the modified enlargements to produce at least a portion of a master negative film.

9. The method of producing motion picture films of the animated cartoon type which comprises forming an image of a background in negative on a translucent screen by projection on one side of said screen, causing action to take place on the opposite side of said screen with the projected image as a background, photographing from the said opposite side of said screen, simultaneously on successive film frames, both the projected image of the background negative and the successive positions of the action to render motion picture film with the action negative and the background positive, any supplemental light present at the said opposite side of said screen being insufficient to bring out all the detail desired in the final reproduction of said action, producing photographic enlargements of images derived from each of the frames of said motion picture film with the action in one sense and the background in the opposite sense, modifying said enlargements by adding cartoon detail to the action images by drawing, and photographing successively in proper sequence and registration each of the modified enlargements to produce at least a portion of a second motion picture film.

10. The method of producing motion picture films of the animated cartoon type which comprises producing a motion picture negative film of a changing scene for use as a background, projecting from one side of a translucent screen images of said motion picture film to form enlarged images thereof on said screen, causing action to take place on the opposite side of said screen with the enlarged images of the changing scene as a background, photographing from the said opposite side of said screen by the use of the light on said screen, simultaneously on successive film frames, both the projected image of the background negative and the successive positions of the action, to render motion picture negative silhouettes of said action with the background positive, producing positives of said action negatives with the background negative, producing photographic enlargements of each of the successive action positives, thus rendering the action negative and the background positive, modifying the action portion of said enlargements by adding cartoon detail thereto by drawing, and successively photographing in proper sequence and registration the modified enlargements to produce at least a portion of a master negative film.

11. The method of producing motion picture films of the animated cartoon type, which comprises producing a motion picture negative film of a changing scene for use as a background, projecting from one side of a translucent screen images of said negative motion picture film to form enlarged images thereof on said screen, causing action to take place on the opposite side of said screen with the enlarged images of the changing scene as a background, photographing from said opposite side of said screen by the use of the light on said screen, simultaneously on successive film frames both the projected negative images of the background scene and the successive positions of the action, to render motion picture negatives of said action with the background positive, any supplemental light present at said opposite side of said screen being insufficient to bring out all the detail desired in the final reproduction of said action, producing photographic enlargements derived from images of each of the successive film frames, thus rendering the action in one sense and the background in the opposite sense, modifying the action portion of said enlargements by adding cartoon detail thereto by drawing, and successively photographing in proper sequence and registration the modified enlargements to produce at least a portion of a motion picture film.

PAUL H. TERRY.